United States Patent [19]

Evrard et al.

[11] Patent Number: 5,130,687
[45] Date of Patent: Jul. 14, 1992

[54] DEVICE FOR STORING ELECTROMAGNETIC ENERGY IN TOROIDAL SUPERCONDUCTING WINDINGS

[75] Inventors: Thierry Evrard, Cravanche; Thanh Tam Tran, Belfort, both of France

[73] Assignee: GEC Alsthom SA, Paris, France

[21] Appl. No.: 592,161

[22] Filed: Oct. 3, 1990

[30] Foreign Application Priority Data

Oct. 9, 1989 [FR] France ................... 89 13152

[51] Int. Cl.$^5$ .............................. H01F 1/00; H01F 5/00
[52] U.S. Cl. ..................................... 335/216; 335/299; 335/300
[58] Field of Search ............... 335/299, 216, 300; 174/125.1, 15.1, 15.4; 336/DIG. 1

[56] References Cited

U.S. PATENT DOCUMENTS

| | | | |
|---|---|---|---|
| 4,151,498 | 4/1979 | Katsurai | 335/216 |
| 4,664,868 | 5/1987 | Kuno et al. | 335/299 |
| 4,896,130 | 1/1990 | Ermilov et al. | 335/300 |
| 4,920,095 | 4/1990 | Ishigaki et al. | 505/1 |

FOREIGN PATENT DOCUMENTS

| | | | |
|---|---|---|---|
| 2114708 | 6/1972 | France | |
| 2618955 | 2/1989 | France | |
| 0033596 | 3/1978 | Japan | 335/216 |
| 0106008 | 7/1982 | Japan | 335/216 |
| 0074407 | 4/1985 | Japan | 336/DIG. 1 |
| WO8901696 | 2/1989 | PCT Int'l Appl. | |

OTHER PUBLICATIONS

Patent Abstracts of Japan, vol. 10, No. 1 (E-371)(2058), Jan. 7, 1986, & JP-A-60 165774 (Toshiba K.K.) Aug. 28, 1985.
Patent Abstracts of Japan, vol. 6, No. 194 (E-134)(1072), Oct. 2, 1982 & JP-A-57 106008 (Tokyo Shibaura Denki K.K.) Jul. 1, 1982.

Primary Examiner—Leo P. Picard
Assistant Examiner—Ramon M. Barrera
Attorney, Agent, or Firm—Sughrue, Mion, Zinn, Macpeak & Seas

[57] ABSTRACT

A device for storing electromagnetic energy in toroidal superconducting windings of circular right cross-section, wherein the device is constituted by a plurality of flat cylindrical coils having a plane of symmetry perpendicular to their own axes and including the axis of the torus, and which are separated by wedge-shaped spacers. The invention is applicable to distribution networks or to electrical machines.

2 Claims, 2 Drawing Sheets

DEVICE FOR STORING ELECTROMAGNETIC ENERGY IN TOROIDAL SUPERCONDUCTING WINDINGS

The present invention relates to a device for storing electromagnetic energy in toroidal superconducting winding of circular right cross-section.

BACKGROUND OF THE INVENTION

Proposals have already been made to store electromagnetic energy in superconducting windings in order to meet fluctuations in demand on distribution networks or in order to regulate electrical machines. Proposals have been made to dispose such windings in the form of a torus having a circular right cross-section for the purpose of reducing the leakage magnetic fields generated around the storage windings as much as possible.

However, making a toroidal superconducting coil is difficult. It is appropriate to begin by making a mandrel onto which the turns of the coil are wound, and to do this it is necessary to have a special winder.

The object of the present invention is to provide a device for storing electromagnetic energy which is easier to manufacture, which is capable of being mass-produced, which does not require a special winder, and which is cheaper.

SUMMARY OF THE INVENTION

The device of the invention is constituted by a plurality of flat cylindrical coils having a plane of symmetry perpendicular to their own axes and including the axis of the torus, and which are separated by wedge-shaped spacers.

It preferably satisfies at least one of the following criteria:
 the coils interfit with the wedge-shaped spacers;
 there are at least twenty flat cylindrical coils; and
 each coil support is pierced by channels for conveying a flow of a refrigerating cryogenic fluid.

BRIEF DESCRIPTION OF THE DRAWINGS

An embodiment of the invention is described by way of example with reference to the accompanying drawings, in which.

DETAILED DESCRIPTION

Figure 1:
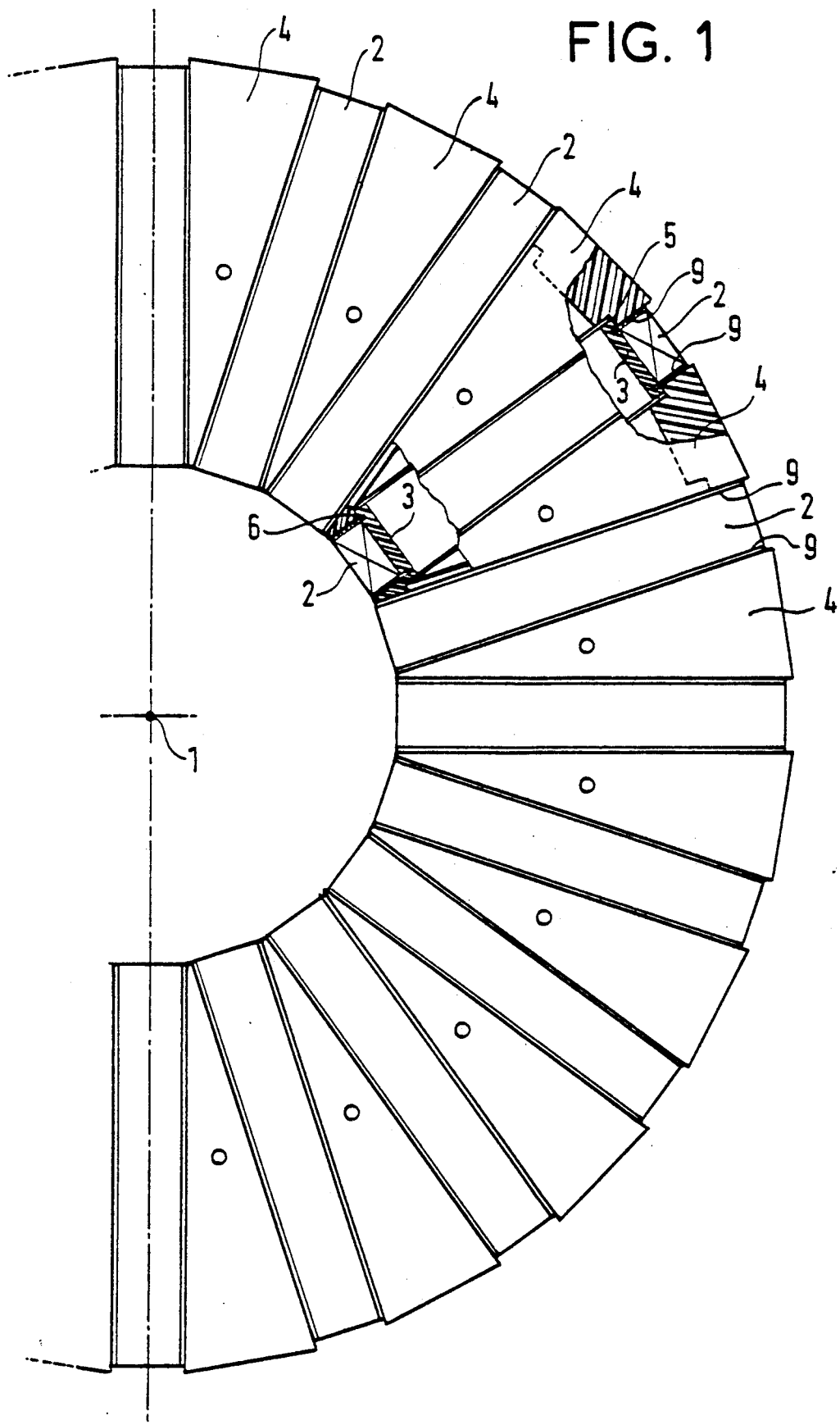
FIG. 1 is a plan view of one half of a toroidal device with some of its coils shown in section on the meridian plane of the torus.

In FIG. 1, the torus of axis 1 includes twenty coils distributed around its perimeter such that their planes of symmetry are at 18° intervals. Each coil 2 per se is wound on a circular support 3. The coils are separated by spacers 4 which are wedge-shaped, and their supports are engaged therein by means of outer shoulders 5 and inner shoulders 6 of the spacers. The spacers may be constituted by respective single pieces apart from one of the spacers which is intended to close the torus and which is preferably made up of two pieces that are symmetrical about a plane that is tangential to the circular axis of the torus.

Figure 2:
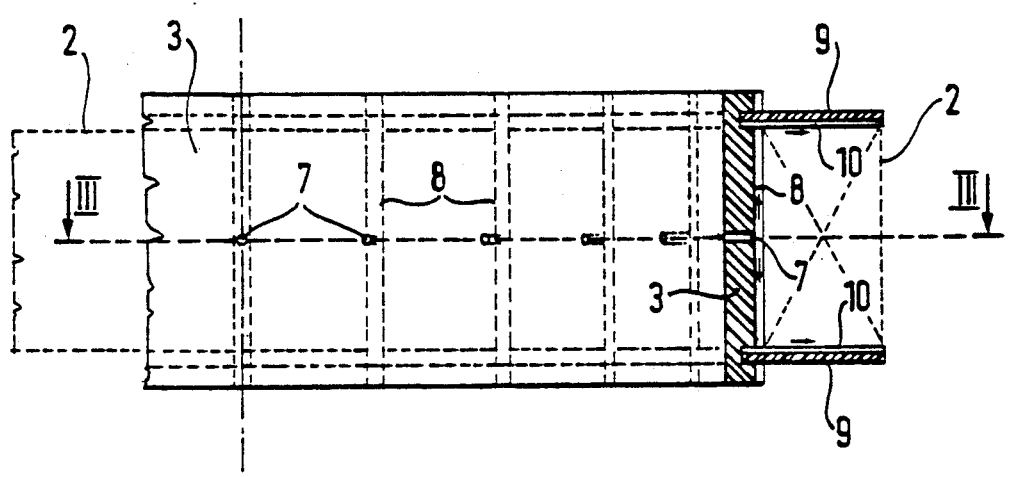
FIG. 2 is a section through one half of a coil on an equatorial plane of the torus (on line II—II of FIG. 3)

FIG. 2 shows channels 7 through which a cooling cryogenic fluid such as helium flows through the circular support 3 of the coil, then through channels at 8 which extend parallel to he axis of the circular support 3 beneath the conductors of the coil prior to being evacuated radially along endplates 9.

Figure 3:
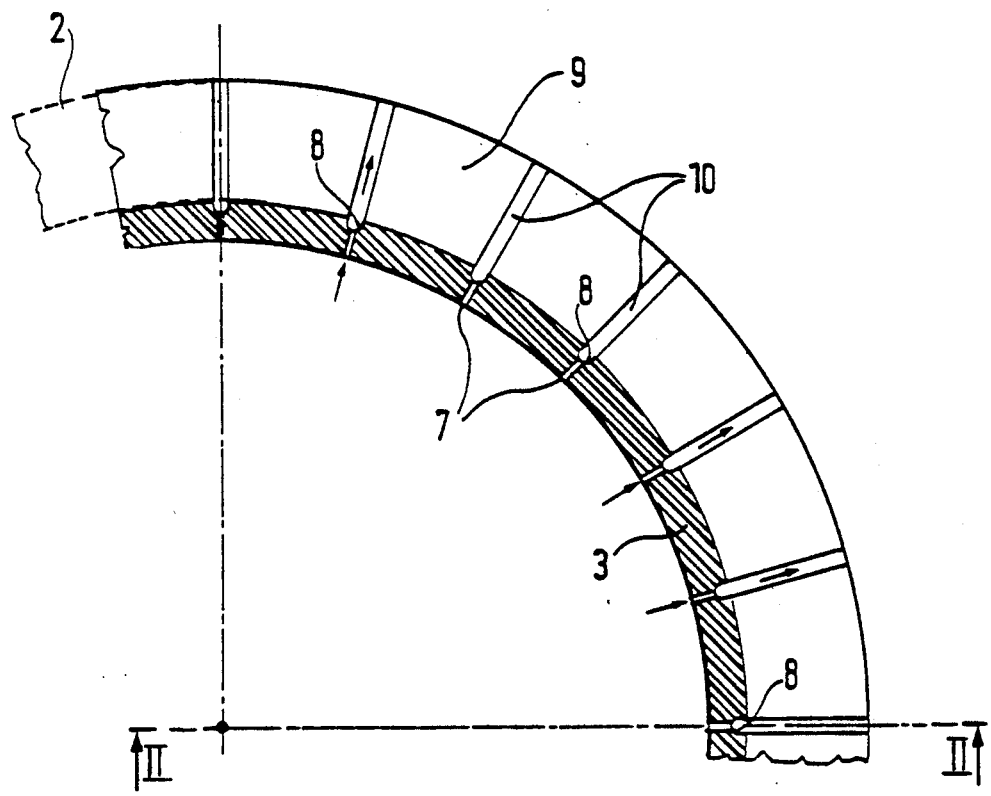
FIG. 3 is a section on line III—III of FIG. 2, with the coil conductors removed.

The section of FIG. 3 shows an endplate of the coil support which is notched by radial channels 10 enabling the cooling fluid to be removed via the channel 8 beneath the coil conductors.

The conductors of one coil are naturally connected to the conductors of the adjacent coils by link conductors (not shown).

We claim:

1. A device for storing electromagnetic energy in a plurality of superconducting windings, a circular coil support for each superconducting winding, said windings being disposed on said circular supports as individual flat cylindrical coils so as to form a torus of circular right cross-section, with said windings being constituted by a plurality of said flat cylindrical coils connected together, each flat cylindrical coil having a plane or symmetry perpendicular to the axis of the flat cylindrical coil and including the axis of the torus, each coil being separated by wedge-shaped spacers interposed circumferentially between said circular coil supports, wherein each coil support is pierced by channels for conveying a flow of a refrigerating cryogenic fluid, and wherein said channels of each circular support includes a plurality of circumferentially spaced first radial channels extending through the circular support for passing a cooling cryogenic fluid through the support and beneath conductors of the coil wound thereon, each said support further comprises second channels extending parallel to the axis of the circular support within a face of the circular support proximate to the coil supported thereon and each said circular support further comprises axially spaced, radially outwardly projecting end plates on respective axial faces of the coil conductors, and wherein said end plates are notched with circumferentially spaced radial channels extending to and communicating with opposite ends of the second channels within the circular support beneath the conductors of the coil and extending parallel to the axis of the circular support, whereby said cooling cryogenic fluid may be evacuated radially along the end plates.

2. A device according to claim 1 wherein there are at least twenty flat cylindrical coils.

* * * * *